United States Patent [19]

Okubo

[11] Patent Number: 4,618,260
[45] Date of Patent: Oct. 21, 1986

[54] SLIT CHANGING DEVICE FOR MONOCHROMATOR

[75] Inventor: Kunihiko Okubo, Moriyama, Japan

[73] Assignee: Shimadzu Corporation, Kyoto, Japan

[21] Appl. No.: 546,527

[22] Filed: Oct. 28, 1983

[30] Foreign Application Priority Data

Oct. 30, 1982 [JP] Japan ............................... 57-191582

[51] Int. Cl.[4] .............................................. G01J 3/18
[52] U.S. Cl. .................................... 356/331; 356/334
[58] Field of Search ............... 356/317, 318, 326, 331, 356/332, 334; 350/271; 364/498

[56] References Cited

U.S. PATENT DOCUMENTS

| 3,508,813 | 4/1970 | Smith, Jr. et al. | 356/334 |
| 3,668,990 | 6/1972 | Hayes | 350/271 |
| 3,893,753 | 7/1975 | Glenn | 350/271 |
| 4,084,906 | 4/1978 | Bibbero | 356/326 |
| 4,318,616 | 3/1982 | Chamran et al. | 356/332 |
| 4,323,309 | 4/1982 | Akitomo et al. | 364/498 |
| 4,325,634 | 4/1982 | Tohyama | 356/332 |
| 4,396,288 | 8/1983 | Helphrey | 356/332 |
| 4,437,763 | 3/1984 | Kaye | 356/326 |
| 4,482,251 | 11/1984 | Saylor | 364/498 |
| 4,483,590 | 11/1984 | Moss | 356/334 |

FOREIGN PATENT DOCUMENTS

| 0039183 | 3/1979 | Japan | 356/334 |
| 2072841 | 10/1981 | United Kingdom | 356/319 |

OTHER PUBLICATIONS

"An Interactive Microprocessor-Controlled Spectrophotometer," Malone et al., Am. Lab., Jun. 1980, vol. 12, No. 6, pp. 76-81.

Primary Examiner—F. L. Evans
Assistant Examiner—Joel L. Harringa
Attorney, Agent, or Firm—Birch, Stewart, Kolasch & Birch

[57] ABSTRACT

A slit changing device for a monochrometer comprises a slit disc forming a plurality of pairs of slits each having different widths, a pulse motor for rotating the slit disc, a control circuit for activating the pulse motor, so that any pair of the pairs of slits can be selected, and a keyboard operated to enter target slit information into the control circuit. The coupling between the slit disc and the pulse motor is slipless and backlashless. The control circuit comprises a present slit pulse counter for storing the pulse number of a presently selected slit pair and a target pulse counter for storing the pulse number of a target slit pair.

2 Claims, 8 Drawing Figures

SLIT CHANGING DEVICE FOR MONOCHROMATOR

BACKGROUND OF THE INVENTION

The present invention relates to a monochrometer and, more particularly, to a device for changing a plurality of slits having different widths suitable for use with a monochrometer.

A conventional monochrometer needs a device for changing a plurality of slits having different widths. To change the widths of the slits, a slit blade is moved in a first type of conventional system. A second type of conventional system includes a plurality of slits having different and fixed clearances so that the plurality of slits are selectively changed. The second system is superior to the first one in that the slit widths are more reliable.

In another aspect of the monochrometer, it is desired that the slits for the monochrometer be speedily selected and the selected data of the slits such as the widths of the selected slits be recorded.

SUMMARY OF THE INVENTION

Accordingly, it is an object of the present invention to provide an improved monochrometer.

It is another object of the present invention to provide an improved device for changing a plurality of slits for a monochrometer.

It is a further object of the present invention to provide an improved device for changing a plurality of slits for a monochrometer, cotrolled by a central processing unit, so that the device becomes compact.

Other object and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a slit changing device for a monochrometer comprises slit disc means forming a plurality of pairs of slits each having different widths, pulse motor means for rotating the slit disc means, control means for activating the pulse motor means, so that any pair of the pairs of slits can be selected, and a keyboard means operated to enter target slit information into the control means. The coupling between the slit disc means and the pulse motor means is slipless and backlashless. The control means comprises a present slit pulse counter for storing the pulse number of a presently selected slit pair and a target pulse counter for storing the pulse number of a target slit pair.

BRIEF DESCRIPTION OF THE DRAWING

The above-mentioned features and objects of the present invention will become more apparent by reference to the following description taken in conjunction with accompanying drawings wherein like reference numerals and symbols indicate like elements, and in which.

DESCRIPTION OF THE INVENTION

Figure 1:
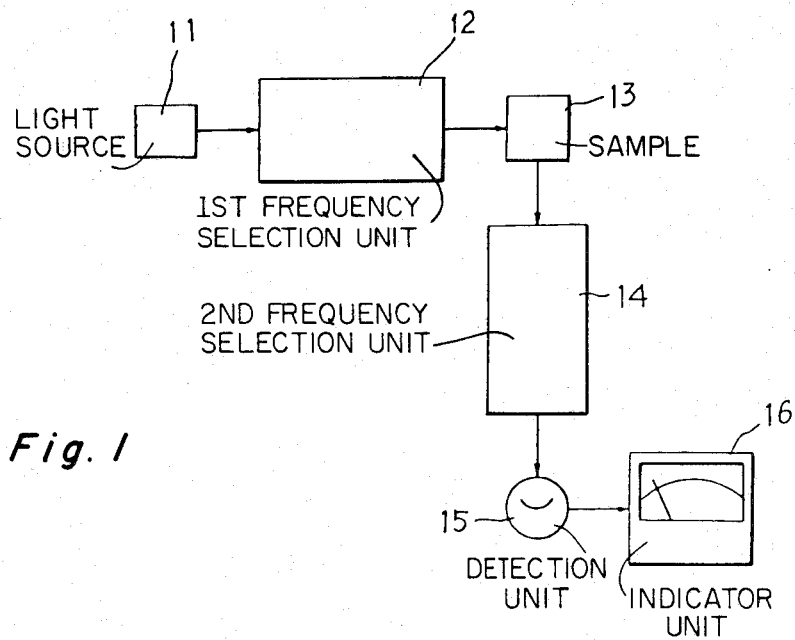
FIG. 1 shows a schematic block diagram of a fluorescence analyzing instrument to which a monochrometer of the present invention is applied.

FIG. 1 shows a schematic block diagram of a fluorescence analyzing instrument for analyzing fluorescence, phosphorescence, and spectra peculiar to a material and generated in response to the exposure of a light to a sample. The fluorescence analyzing instrument of FIG. 1 comprises a light source 11, a first frequency selection unit 12, a sample 13, a second frequency selection unit 14, a detection unit 15, and an indicator unit 16. The light source 11 may be a xenon lamp or a mercury lamp for emitting light toward the first frequency selection unit 12. To select an activation light or a fluorescence having a particular frequency, the first and the second frequency selection units 12 and 14 are provided. A monochrometer of the present invention is provided in either or both of the first and the second frequency units 12 and 14. The detector unit 15 comprises a photomultiplier for detecting a fluorescence emitted from the sample 13 by the light selected by the first frequency selection unit 12. The second frequency selection unit 14 selects the frequency of the fluorescence detected by the detector unit 15. The data of the detector unit 15 are indicated by the indicator unit 16.

Figure 2:
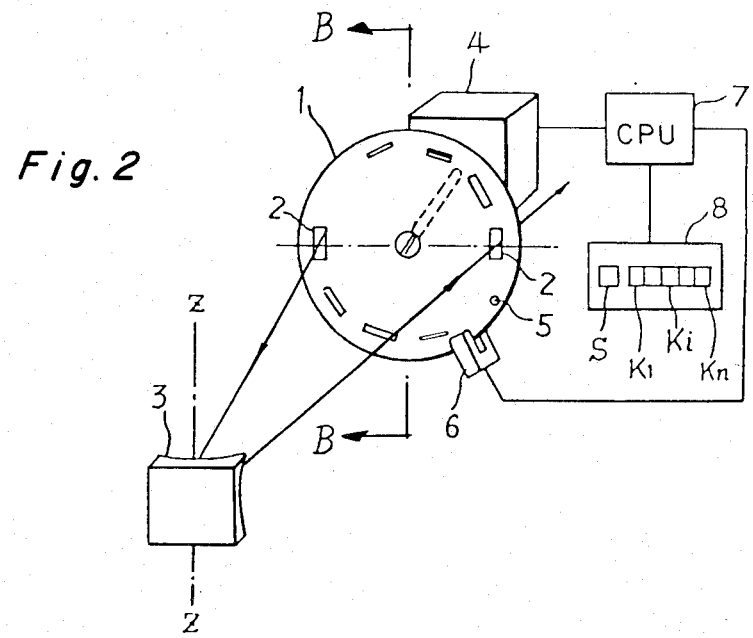
FIG. 2 shows a perspective view of a slit changing device in a monochrometer of a first preferred embodiment of the present invention.

FIG. 2 shows a device for changing a plurality of slits for a monochrometer according to a first preferred embodiment of the present invention. The device of FIG. 2 comprises a slit disc 1 containing a plurality of slits 2, a concave grating 3, a pulse motor 4, a photocoupler 6, a central processing unit (CPU) 7, and a control pane 8 containing a keyboard.

The plurality of slits are a plurality of pairs of slits the slits of each pair being diametrically disposed on disc 1. All the slits are formed around the periphery of the slit disc 1 such that the respective pairs of slits have different widths of the clearences and each of the respective pairs of slits is symetrically positioned at each end of the periphery of the slit disc 1 on a diameter line.

The monochrometer as shown in FIG. 2 is of an in-plane type. The in-plane type monochrometer is characterized in that a plane containing the optical axes of an incident ray upon and an ejection ray from the concave grating 3, and a normal line to the center of the grating 3 is perpendicular to a rotating axis z of the grating 3.

One pair of slits each positioned at each end of the periphery of the slit disc 1 pass the incident ray and the ejection ray, respectively. They function as a light entrance slit and a light exit slit. By rotating the slit disc 1 appropriately, one pair of slits are selected which have the same slit width different from the slid width of the remaining pairs of slits.

A single opening 5 is formed in the slit disc 1. The photocoupler 6 is disposed to surround the plane of the slit disc 1, so that the photocoupler 6 can detect the single opening 5. The shaft of the pulse motor 4 is directly coupled to the slit disc 1. When the photocoupler 6 detects the opening 5, it is detected that the slit disc 1 is at a start position, so that the pulse motor 4 rotates the slit disc 1.

The CPU 7 permits the pulse motor 4 to rotate the slit disc 1. The keyboard of the control panel 8 contains slit width selection keys K1–Kn each activated to select slit width, and a start key S. When the start key S is activated, pulses are developed from the CPU 7 to the pulse motor 4, so that the pulse motor 4 is rotated in a single direction and stopped when the photocoupler 6 detects the opening 5.

Under the circumstances, a desired slit width selection key Ki is activated, so that the pulse motor 4 continues to rotate in the same direction as the pulse motor 4 started to rotate. When an appropriate pair of slits are positioned at a prescribed position (the positions of slits 2 of FIG. 2) by the control of the CPU 7, the CPU 7 causes the pulse motor 4 to stop the rotation of the slit disc 1. Thereafter, when another slit width selection key is actuated, the pules motor 4 causes the slit disc 1 to rotate so as to position another appropriate pair of slits at the prescribed position.

Since the slit disc 1 is directly coupled to the shaft of the pulse motor 4, the rotation connection between them does not create any slip and backlash. However, depending upon the rotation direction before the stop of the slit disc 1, some deviation from the intended stop position may be present.

To minimize an amount of the possible deviation as much as possible, it is preferable that the final rotation of the slit disc 1 be in a single direction before an appropriate pair of slits reach the prescribed position. This single direction may be the same direction in which the slit disc 1 starts to rotate or it may be in the opposite direction depending on the relationship of the present and target positions.

Of course, it may be more simple if the slit disc 1 is continuously rotated in the same direction. However, this simple method may produce the problem that, if it is desired that a pair of slits next to a presently selected pair of slits, the slit disc 1 must be rotated by an approximately full turn. This needs a long time for slit change. Therefore, this method has disadvantages.

According to the present invention, when a desired pair of slits are selected, by the slit width selection key, the slit disc 1 is caused to rotate in the same direction as pulse motor 4 started to rotate which is either (a positive direction), or the opposing direction, such that, with a minimum rotation amount, a pair of slits next to the desired pair of slits are positioned at the prescribed position. Next, if the slit disc 1 was previously rotated in said opposing direction it is further caused to rotate in the positive direction, so that the desired pair of slits are positioned at the prescribed position. Therefore, the final positioning of the slits is always achieved by rotation of the slit disc 1 in the positive direction.

Figure 3:
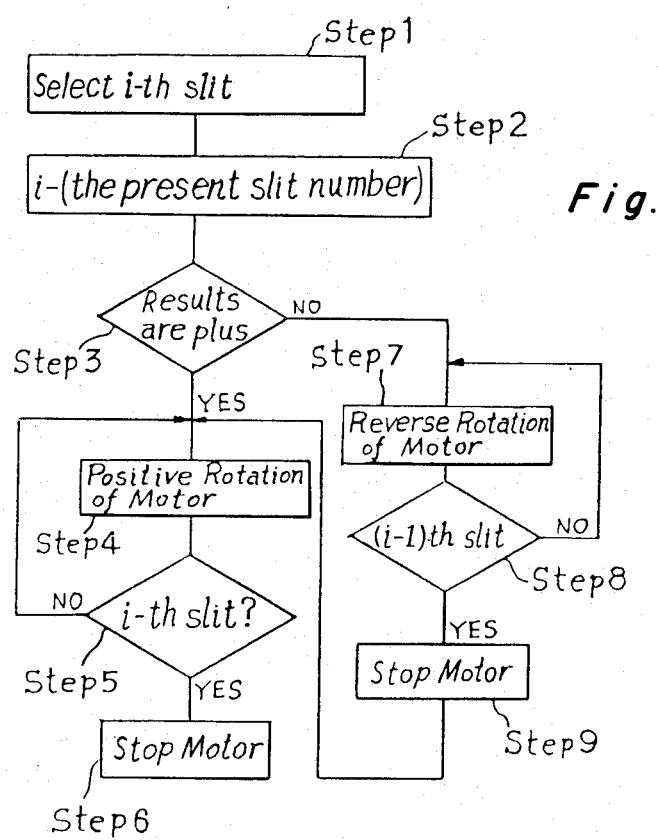
FIGS.3 shows a flow chart of the operation of a the CPU in FIG. 2.

FIG. 3 shows a flow chart of the rotation principle of the slit disc 1 according to the present invention. The flow chart of FIG. 3 is as follows: In step 1, a desired slit Ki is selected. In step 2, the number of the presently selected slit is subtracted from the number "i". The results of the subtraction in step 2 are determined to be positive or negative in step 3. When the positive results are obtained, the pulse motor 4 is permitted to rotate the slit disc 1 in the positive direction in steps 4–6 until an i-th pair of slits are positioned at the prescribed position. When the negative results are obtained in step 3, the pulse motor 4 is permitted to rotate the slit disc 1 in the opposing direction in steps 7–9, until a (i−1)th pair of slits are positioned at the prescribed position. Next, the program is advanced to a point A, so that steps 4 to 6 are selected in which the pulse motor 4 is permitted to rotate the slit disc 1 in the positive direction until the i-th pair of slits are positioned at the prescribed position.

In the above preferred form of the present invention, when the negative results are obtained in step 2, the slit disc 1 is rotated in the opposing direction until the preceding pair of slits are positioned in the prescribed position. It is not necessary to rotate the slit disc 1 by such a large amount. It is only necessary to overrun the slit disc 1 in the opposing direction by an amount from the desired final pair of slits to one or more steps of the pulse motor 4.

All the pairs of slits are numbered along the positive direction of the rotation of the slit disc 1 from the first to the subsequent ones.

Figure 4:
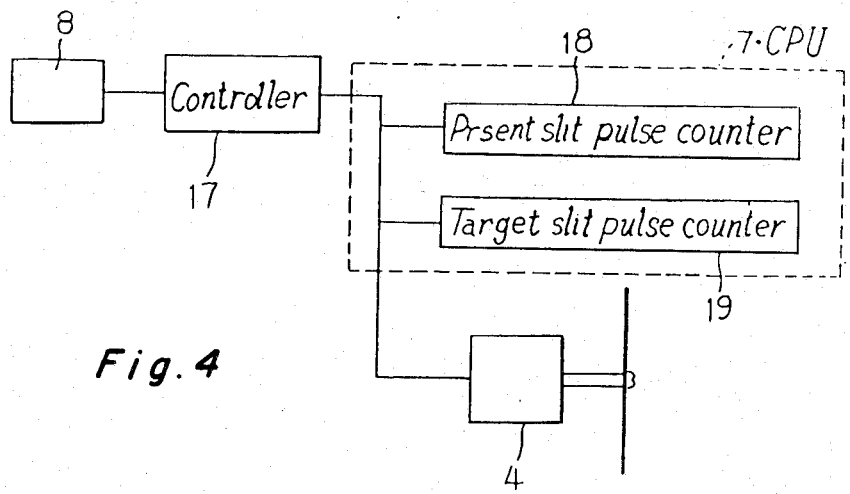
FIG. 4 shows a block diagram of the CPU.

FIG. 4 shows a block diagram of the CPU 7. The CPU 7 comprises a controller 17, a present slit pulse counter 18, and a target slit pulse counter 19. The controller 17 controlls data entry to the counters 18 and 19. The present slit pulse counter 18 is provided for storing the pulse number of a presently selected slit. The target slit pulse counter 19 is provided for storing the pulse number of a target slit.

Figure 5:
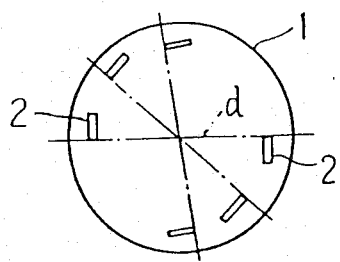
FIG. 5 shows a front view of a slit disc according to a second preferred embodiment of the present invention.

At the start point related to the single opening 5, the present slit pulse counter 18 stores the zero counter. An address in the form of the pulse number is assigned to each of the pairs of the slits 2 in the slit disc 1. For example, the first pair of the slits have a 100-pulse number and the second pair of the slits have a 200-pulse number. To select the first pair of the slits, 100 counts are inputted into the keyboard 8, so that the keyboard 8 develops a command for selecting the first pair of the slits. Responsive to the command from the keyboard 8, the controller 17 permits the target slit pulse counter 19 to store the 100 counts. Before the contents of the present slit pulse counter 18 equal those of the target slit pulse counter 19, the controller 17 advances the contents of the present slit pulse counter 18 and develops pulses toward the pulse motor 4. FIG. 5 shows a front view of a slit disc 1 according to a second preferred from of the present invention. The slit disc 1 of FIG. 5 is adapted for use with an off-plane type monochrometer. The off-plane type monochrometer is characterized in that the optical axes of an incident ray upon and ejection ray from a grating pass the center of the grating and that the optical axes are separated, respectively, to the upper side and the lower side of a plain normal to the rotating axis of the grating. The slit disc 1 of FIG. 5 is different from that of FIG. 2 in that each of a pair of a light incident slit 2 and a light ejection slit 2 is positioned at the periphery of the slit disc 1 and at the upper side and the lower side of a diameter line d, with being contact with the diameter line.

Figure 6:
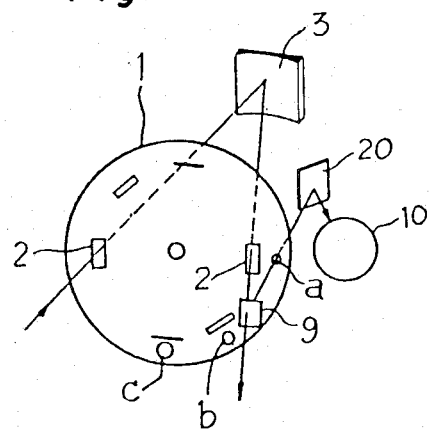
FIG. 6 shows a schematic rear view of a slit disc according to a third preferred embodiment of the present invention.

FIG. 6 shows a third preferred form of the slit disc 1 in which a plurality of stop apertures a,b,c and the like are formed, so that the intensity of the light source is monitored. The light passing through the light exit slits of slits 2 is divided by a beam splitter 9 made of a crystal plate to form two rays, one of which passes back through the stop aperture a. A monitoring photodetector 10 receives the ray passing through the stop aperture a through a scattering plate 20 made of tefron. The beam splitter 9 is positioned behind either of the pairs of the slits 2, so that the light passing through said either of the pairs of slits 2 can be incident upon the beam splitter 9. The diameter of each of the stop apertures is selected to have an inverse relationship to each light exit slit having a different slit width. A stop aperture b whose diameter is wide is related to a slit whose width is narrow. Another stop aperture a whose diameter is narrow is related to another slit whose width is wide.

Depending upon subsequent slits whose widths are different, the intensity of the light ejected from the light exit slits is remarkably different. If a monitor means directly receives the light to monitor the light source, the monitor means must have a wide dynamic range. On the contrary, with the help of the selection of the stop apertures whose diameters are different in inverse relation to the subsequent slits whose widths are different also, the monitoring photodetector 10 receives the light passing through the stop apertures, so that the photodetector 10 can have a narrow dynamic range.

Figure 7:
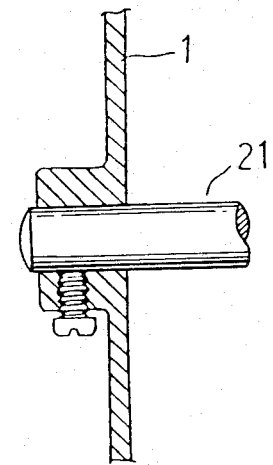
FIG. 7 shows a sectional view taken along line B—B of FIG. 2.
Figure 8:
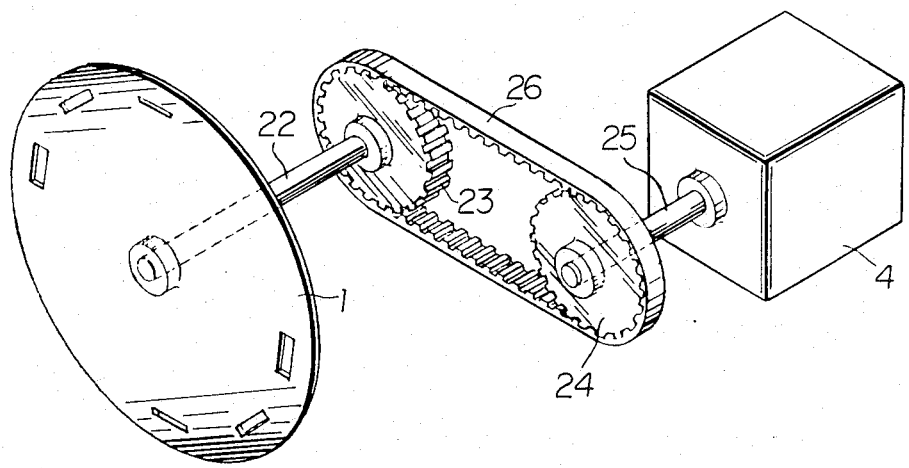
FIG. 8 shows a perspective view of a disc drive mechanism according to a fourth preferred embodiment of the present invention.

FIG. 7 shows a sectional view of the slit disc 1 and a shaft 21 coupled between the slit disc 1 and the pulse motor 4. The shaft 21 is directly coupled to the slit disc 1, so that no slip and backlash is caused in the coupling between the slit disc 1 and the pulse motor 4. FIG. 8 shows a perspective view of a disc drive mechanism according to a fourth preferred embodiment of the present invention. Between the slit disc 1 and the pulse motor 4, a first shaft 22, a first pulley 23, a second pulley 24, and a second shaft 25 are provided. Across the first and the second pulleys 23 and 24, a notched belt 27 is weared to prevent the slip and the backlash.

Otherwise, any other drive mechanism with a belt prevents the backlash and , in addition, the slip , when an appropriate design is praticed. Further, only gear coupling mechanism can provide the slipless coupling.

The invention being thus described, it will be obvious that the same way be varied in many ways. Such variations are not to be regarded as a departure from the spirit and scope of the invention, and all such modifications are intended to be included within the meter of the following claims.

What is claimed is:

1. A slit positioning system for a monochromator including a diffraction grating comprising:
   (a) slit disc means having a plurality of spaced pairs of slits, each pair including a light-incident slit for directing light onto said grating and a light-ejection slit for receiving light diffracted by said grating, the slits of each pair being of the same width and being diametrically disposed on the slit disc means, the slit widths of the respective pairs being different from each other, each slit pair having a slit number corresponding to a predetermined address on said slit disc means with respect to a positive direction of rotation of the slit disc means;
   (b) stop apertures provided in said slit disc means for each slit pair having aperture widths inversely proportional to the slit widths of the associated slit pairs;
   (c) means for directing light passing through the light-ejection slits back through the associated stop aperture;
   (d) photodetector means for measuring the intensity of light passed back through said stop aperture;
   (e) pulse motor means coupled to said slit disc means for rotating said slit disc means in either said positive direction or a negative direction to position a slit pair of a selected slit number into optical alignment with the diffraction grating;
   (f) means for determining the slit number of the present slit pair in optical alignment with the diffraction grating;
   (g) keyboard means for selecting a slit number of a new slit pair to be positioned by said pulse motor means in optical alignment with said diffraction grating;
   (h) means for comparing the new slit number with the present slit number and generating a positive drive signal when the new slit number is greater than the present slit number and a negative drive signal when the new slit number is smaller than the present slit number; and
   (i) control means for driving said pulse motor means in a positive direction in response to said positive drive signal and in a negative direction followed by said positive direction in response to said negative drive signal to position said new slit pair in optical alignment with said diffraction grating;
   whereby the final direction of rotation which achieves the positioning of said new slit pair is always in said positive direction.

2. The system of claim 1 wherein said control means in response to said negative drive signal causes the pulse motor means to rotate said slit disc means in said negative direction until a slit pair having a slit number of one less than said new slit number is positioned in optical alignment with said diffraction grating, and then rotates said slit disc means in the positive direction until the slit pair having the new slit number is optically aligned with said diffraction grating.

* * * * *